United States Patent [19]
Glover

[11] Patent Number: 6,151,178
[45] Date of Patent: *Nov. 21, 2000

[54] ERROR ESTIMATION CIRCUIT AND METHOD USING AN ANALOG-TO-DIGITAL CONVERTER

[75] Inventor: Kerry C. Glover, Wylie, Tex.

[73] Assignee: Texas Instruments Incorporated, Dallas, Tex.

[*] Notice: This patent issued on a continued prosecution application filed under 37 CFR 1.53(d), and is subject to the twenty year patent term provisions of 35 U.S.C. 154(a)(2).

[21] Appl. No.: 08/819,064

[22] Filed: Mar. 18, 1997

Related U.S. Application Data

[60] Provisional application No. 60/013,663, Mar. 19, 1996.

[51] Int. Cl.$^7$ .............................. G11B 5/09; G11B 5/035
[52] U.S. Cl. ............................................. 360/46; 360/65
[58] Field of Search ...................... 360/46, 65; 341/156; 327/323

[56] References Cited

U.S. PATENT DOCUMENTS

| | | | |
|---|---|---|---|
| 5,341,249 | 8/1994 | Abbott et al. | 360/46 |
| 5,400,029 | 3/1995 | Kobayashi | 341/156 |
| 5,602,503 | 2/1997 | Muto | 360/65 X |
| 5,847,891 | 12/1998 | Ohmori et al. | 360/46 |

OTHER PUBLICATIONS

Richard C. Schneider, "Sequence (Viterbi–Equivalent) Decoding," *IEEE Transactions on Magnetics*, vol. 24, No. 6, Nov. 1988, pp. 2539–2541.

J.D. Coker, R.L. Galbraith, G.J. Kerwin, J.W. Rae, P.A. Ziperovich, "Implementation of PRML in a Rigid Disk Drive," *IEEE Transactions on Magnetics*, vol. 27, No. 6, Nov. 1991, pp. 4538–4543.

H. Kobayashi and D.T. Tang, "Application of Partial–response Channel Coding to Magnetic Recording Systems," *IBM J. Res. Develop.*, Jul. 1970, pp. 368–375.

Kenneth Abend and Bruce D. Fritchman, "Statistical Detection for Communication Channels with Intersymbol Interference," *Proceedings of the IEEE*, vol. 58, No. 5, May 1970, pp. 779–785.

G. David Forney, Jr., "Maximum–Likelihood Sequence Estimation of Digital Sequences in the Presence of Intersymbol Interference," *IEEE Transactions on Information Theory*, vol. IT–18, No. 3, May 1972, pp. 363–378.

G. David Forney, Jr., "The Viterbi Algorithm," *Proceedings of the IEEE*, vol. 61, No. 3, Mar. 1973, pp. 268–278.

Lyle J. Fredrickson, "Viterbi Detection of Matched Spectral Null codes for PR4 Systems," *IEEE Transactions on Magnetics*, vol. 28, No. 5, Sep. 1992, pp. 2889–2891.

K. Chopra and D.D. Woods, "A Maximum Likelihood Peak Detecting Channel," *IEEE Transactions on Magnetics*, vol. 27, No. 6, Nov. 1991, pp. 4819–4821.

Arvind M. Patel, "A New Digital Signal Processing Channel for Data Storage Products," *IEEE Transactions on Magnetics*, vol. 27, No. 6, Nov. 1991, pp. 4579–4584.

Gottfried Ungerboeck, "Adaptive Maximum–Likelihood Receiver for Carrier–Modulated Data–Transmission Systems," *IEEE Transactions on Communications*, vol. Com–22, No. 5, May 1974, pp. 624–636.

(List continued on next page.)

*Primary Examiner*—Paul Loomis
*Assistant Examiner*—Regina Y. Neal
*Attorney, Agent, or Firm*—W. Daniel Swayze, Jr.; W. James Brady, III; Frederick J. Telecky, Jr.

[57] ABSTRACT

A read channel (18) is provided for use in a mass storage system. The read channel (18) includes a plurality of circuit modules and an error estimation circuit (50). The plurality of circuit modules receive an analog data signal from a disk/head assembly (12) and condition the signal to provide a digital data signal. The error estimation circuit (50) receives an analog signal from one of the plurality of circuit modules and analyzes the analog signal. The error estimation circuit (50) provides digital error signal (94) and digital level estimation signal (96) as a result.

16 Claims, 3 Drawing Sheets

OTHER PUBLICATIONS

Peter Kabal and Subbarayan Pasupathy, "Partial–Response Signaling," *IEEE Transactions on Communications*, vol. Com–23, No. 9, Sep. 1975, pp. 921–934.

C.T. Beare, "The Choice of the Desired Impulse Response in Combined Linear–Viterbi Algorithm Equalizers," *IEEE Transactions on Communications*, vol. Com–26, No. 8, Aug. 1978, pp. 1301–1307.

R.A. Baugh, E.S. Murdock, and B.R. Natarajan, "Measurement of Noise in Magnetic Media," *IEEE Transactions on Magnetics*, vol. MAG–19, No. 5, Sep. 1983, pp. 1722–1724.

Hans Burkhardt and Lineu C. Barbosa, "Contributions to the Application of the Viterbi Algorithm," *IEEE Transactions on Information Theory*, vol. IT–31, No. 5, Sep. 1985, pp. 626–634.

Yaw–Shing Tang, "Noise Autocorrelation in Magnetic Recording Systems," *IEEE Transactions on Magnetics*, vol. MAG–21, No. 5, Sep. 1985, pp. 1389–1394.

Roger W. Wood and David A. Petersen, "Viterbi Detection of Class IV Partial Response on a Magnetic Recording Channel," *IEEE Transactions on Communications*, vol. COM–34, No. 5, May 1986, pp. 454–461.

Yaw–Shing Tang, "Noise Autocorrelation in High Density Recording on Metal Film Disks," *IEEE Transactions on Magnetics*, vol. MAG–22, No. 5, Sep. 1986, pp. 883–885.

C. Michael Melas, Patrick Arnett, Irene Beardsley, and Dean Palmer, "Nonlinear Superposition in Saturation Recording of Disk Media," *IEEE Transactions on Magnetics*, vol. MAG–23, No. 5, Sep. 1987, pp. 2079–2081.

Dean Palmer, Pablo Ziperovich, Roger Wood, and Thomas D. Howell, "Identification of Nonlinear Write Effects Using Pseudorandom Sequences," *IEEE Transactions on Magnetics*, vol. MAG–23, No. 5, Sep. 1987, pp. 2377–2379.

Roger Wood, "Jitter vs. Additive Noise in Magnetic Recording: Effects on Detection," *IEEE Transactions on Magnetics*, vol. MAG–23, No. 5, Sep. 1987, pp. 2683–2685.

H.K. Thapar and A.M. Patel, "A Class of Partial Response Systems for Increasing Storage Density in Magnetic Recording,"*IEEE Transactions on Magnetics*, vol. MAG–23, No. 5, Sep. 1987, pp. 3666–3668.

Yinyi Lin and Jack K. Wolf, "Combined ECC/RLL Codes," *IEEE Transactions on Magnetics*, vol. 24, No. 6, Nov. 1988, pp. 2527–2529.

Catherine A. French, Anthony D. Weathers, and Jack Keil Wolf, "A Gereralized Scheme for Generating and Detecting Recording Channel Output Waveforms with Controlled Pulse Polarity," *IEEE Transactions on Magnetics*, vol. 24, No. 6, Nov. 1988, pp. 2530–2532.

Richard C. Schneider, "Write Equalization for Generalized (d,k) Codes," *IEEE Transactions on Magnetics*, vol. 24, No. 6, Nov. 1988, pp. 2533–2535.

Michael Melas, Patrick Arnett, and Jaekyun Moon, "Noise in a Thin Metallic Medium: The Connection with Nonlinear Behaviour," *IEEE Transactions on Magnetics*, vol. 24, No. 6, Nov. 1988, pp. 2712–2714.

Jaekyun J. Moon and L. Richard Carley, "Partial Response Signaling in a Magnetic Recording Channel," *IEEE Transactions on Magnetics*, vol. 24, No. 6, Nov. 1988, pp. 2973–2975.

F. Dollvo, R. Hermann, and S. Olcer, "Performance and Sensitivity Analysis of Maximum–Likelihood Sequence Detection on Magnetic Recording Channels," *IEEE Transactions on Magnetics*, vol. 25, No. 5, Sep. 1989, pp. 4072–4074.

Roger Wood, "New Detector for 1,k Codes Equalized to Class II Partial Response," *IEEE Transactions on Magnetics*, Vol. 25, No. 5, Sep. 1989, pp. 4075–4077.

J.W.M. Bergmans, S. Mita, and M. Izumita, "Characterization of Digital Recording Channels by Means of Echo Cancellation Techniques," *IEEE Transactions on Magnetics*, vol. 25, No. 5, Sep. 1989, pp. 4078–4080.

Yinyi Lin, "An Estimation Technique for Accurately Modelling the Magnetic Recording Channel Including Nonlinearities," *IEEE Transactions on Magnetics*, vol. 25, No. 5, Sep. 1989, pp. 4084–4086.

Anthony D. Weathers, Catherine A. French, and Jack Keil Wolf, "Results on 'Controlled Polarity' Modulation and Coding," *IEEE Transactions on Magnetics*, vol. 25, No. 5, Sep. 1989, pp. 4090–4092.

Catherine A. French, "Distance Preserving Run–Length Limited Codes," *IEEE Transactions on Magnetics*, vol. 25, No. 5, Sep. 1989, pp. 4093–4095.

Lyle J. Fredrickson and Jack Keil Wolf, "Error Detecting Multiple Block (d,k) Codes," *IEEE Transactions on Magnetics*, vol. 25, No. 5, Sep. 1989, pp. 4096–4098.

Roger Wood, "Enhanced Decision Feedback Equalization," *IEEE Transactions on Magnetics*, vol. 26, No. 5, Sep. 1990, pp. 2178–2180.

Thomas D. Howell, Donald P. McCown, Thomas A. Diola, Yaw–shing Tang, Karl R. Hense, Ralph L. Gee, "Error Rate Performance of Experimental Gigabit Per Square Inch Recording Components," *IEEE Transactions on Magnetics*, vol. 26, No. 5, Sep. 1990, pp. 2298–2302.

Pantas Sutardja, "A Post–Compensation Scheme for Peak–Detect Channel," *IEEE Transactions on Magnetics*, vol. 26, No. 5, Sep. 1990, pp. 2303–2305.

L.L. Nunnelley, M.A. Burleson, L.L. Williams, and I.A. Beardsley, "Analysis of Asymmetric Deterministic Bitshift Errors in a Hard Disk File," *IEEE Transactions on Magnetics*, vol. 26, No. 5, Sep. 1990, pp. 2306–2308.

H.K. Thapar, N.P.Sands, W.L. Abbott, and J.M. Cioffi, "Spectral Shaping for Peak Detection Equalization," *IEEE Transactions on Magnetics*, vol. 26, No. 5, Sep. 1990, pp. 2309–2311.

Lyle J. Fredrickson, "Coding for Maximum Likelihood Detection on a Magnetic Recording Channel," *IEEE Transactions on Magnetics*, vol. 26, No. 5, Sep. 1990, pp. 2315–2317.

Lyle J. Fredrickson, "A (D,K,C) = (0,3,5/2) Rate 8/10 Modulation Code," *IEEE Transactions on Magnetics*, vol. 26, No. 5, Sep. 1990, pp. 2318–2320.

R. Hermann, "Volterra Modeling of Digital Magnetic Saturation Recording Channels," *IEEE Transactions on Magnetics*, vol. 26, No. 5, Sep. 1990, pp. 2125–2127.

Roger Wood, Mason Williams, and John Hong, "Considerations for High Data Rate Recording with Thin–Film Heads," *IEEE Transactions on Magnetics*, vol. 26, No. 6, Nov. 1990, pp. 2954–2959.

Jaekyun Moon and L. Richard Carley, "Performance Comparison of Detection Methods in Magnetic Recording," *IEEE Transactions on Magnetics*, vol. 26, No. 6, Nov. 1990, pp. 3155–3172.

William L. Abbott, John M. Cioffi, and Hemant K. Thapar, "Performance of Digital Magnetic Recording with Equalization and Offtrack Interference," *IEEE Transactions on Magnetics*, vol. 27, No. 1, Jan. 1991, pp. 705–716.

Jan W.M. Bergmans, Seiichi Mita, and Morishi Izumita, "A Simultation Study of Adaptive Reception Schemes for High–Density Digital Magnetic Storage," *IEEE Transactions on Magnetics*, vol. 27, No. 1, Jan. 1991, pp. 717–723.

Ching Tsang and Yaw–Shing Tang, "Time–Domain Study of Proximity–Effect Induced Transition Shifts," *IEEE Transactions on Magnetics*, vol. 27, No. 2, Mar. 1991, pp. 795–802.

K.B. Klaassen, "Magnetic Recording Channel Front–Ends," *IEEE Transactions on Magnetics*, vol. 27, No. 6, Nov. 1991, pp. 4503–4508.

John Hong, Roger Wood, David Chan, "An Experimental 180 Mb/sec PRML Channel for Magnetic Recording," *IEEE Transactions on Magnetics*, vol. 27, No. 6, Nov. 1991, pp. 4532–4537.

Jonathan D. Coker, Richard L. Galbraith, and Gregory J. Kerwin, "Magnetic Characterization using Elements of a PRML Channel," *IEEE Transactions on Magnetics*, vol. 27, No. 6, Nov. 1991, pp. 4544–4548.

L. Richard Carley and John G. Kenney, "Comparison of Computationally Efficient Forms of FDTS/DF Against PR4–ML," *IEEE Transactions on Magnetics*, vol. 27, No. 6, Nov. 1991, pp. 4567–4572.

Jaekyun Moon, "Discrete–Time Modeling of Transition–Noise Dominant Channels and Study of Detection Performance," *IEEE Transactions on Magnetics*, vol. 27, No. 6, Nov. 1991, pp. 4573–4578.

Jack Keil Wolf, "A Survey of Codes for Partial Response Channels," *IEEE Transactions on Magnetics*, vol. 27, No. 6, Nov. 1991, pp. 4585–4589.

Norman L. Koren, "Matched Filter Limits and Code Performance in Digital Magnetic Recording," *IEEE Transactions on Magnetics*, vol. 27, No. 6, Nov. 1991, pp. 4594–4599.

H.M. Hilden, D.G. Howe, and E.J. Weldon, Jr., "Shift Error Correcting Modulation Codes," *IEEE Transactions on Magne0.tics*, vol. 27, No. 6, Nov. 1991, pp. 4600–4605.

Derek D. Kumar and Bill J. Hunsinger, "ACT–enabled 100MHz Channel Equalizer," *IEEE Transactions on Magnetics*, vol. 27, No. 6, Nov. 1991, pp. 4799–4803.

Alan J. Armstrong and Jack Keil Wolf, "Performance Evaluation of a New Coding Scheme for the Peak Detecting Magnetic Recording Channel," *IEEE Transactions on Magnetics*, vol. 27, No. 6, Nov. 1991, pp. 4804–4806.

S. Raghavan and H.K. Thapar, "Feed–Forward Timing Recovery for Digital Magnetic Recording," *International Conference on Communications Conference Record*, vol. 2, 1991, pp. 794–798.

S.A. Raghavan and H.K. Thapar, "On Feed–Forward and Feedback Timing Recovery for Digital Magnetic Recording Systems," *IEEE Transactions on Magnetics*, vol. 27, No. 6, Nov. 1991, pp. 4810–4812.

James Fitzpatrick and Jack Keil Wolf, "A Maximum Likelihood Detector for Nonlinear Magnetic Recording," *IEEE Transactions on Magnetics*, vol. 27, No. 6, Nov. 1991, pp. 4816–4818.

John G. Kenney, Peter Alexix McEwen, and L. Richard Carley, "Evaluation of Magnetic Recording Detection Schemes for Thin Film Media," *IEEE Transactions on Magnetics*, vol. 27, No. 6, Nov. 1991, pp. 4822–4824.

Pablo A. Ziperovich, "Performance Degradation of PRML Channels Due to Nonlinear Distortions," *IEEE Transactions on Magnetics*, vol. 27, No. 6, Nov. 1991, pp. 4825–4827.

Jaekyun Moon and Jian–Gang Zhu, "Nonlinear Effects of Transition Broadening," *IEEE Transactions on Magnetics*, vol. 27, No. 6, Nov. 1991, pp. 4831–4833.

Jaekyun Moon, "Signal–to–Noise Ratio Degradation with Channel Mismatch," *IEEE Transactions on Magnetics*, vol. 27, No. 6, Nov. 1991, pp. 4837–4839.

R.D. Barndt, A.J. Armstrong, H.N. Bertram, and J.K. Wolf, "A Simple Statistical Model of Partial Erasure in Thin Film Disk Recording Systems," *IEEE Transactions on Magnetics*, vol. 27, No. 6, Nov. 1991, pp. 4978–4980.

Y. Tang and C. Tsang, "A Technique for Measuring Nonlinear Bit Shift," *IEEE Transactions on Magnetics*, vol. 27, No. 6, Nov. 1991, pp. 5316–5318.

R.D. Barndt and J.K. Wolf, "Modeling and Signal Processing for the Nonlinear Thin Film Recording Channel," *IEEE Transactions on Magnetics*, vol. 28, No. 5, Sep. 1992, pp. 2710–2712.

H. Thapar, J. Rae, C. Shung, R. Karabed, and P. Siegel, "On the Performance of a Rate 8/10 Matched Sepctral Null Code for Class–4 Partial Response," *IEEE Transactions on Magnetics*, vol. 28, No. 5, Sep. 1992, pp. 2883–2888.

Hamid Shafiee and Jaekyun Moon, "Low–Complexity Viterbi Detection for a Family of Partial Response Systems†," *IEEE Transactions on Magnetics*, vol. 28, No. 5, Sep. 1992, pp. 2892–2894.

Weining Zeng and Jaekyun Moon, "Modified Viterbi Algorithm for a Jitter–dominant $1-D^2$ Channel," *IEEE Transactions on Magnetics*, vol. 28, No. 5, Sep. 1992, pp. 2895–2897.

William E. Ryan, "Comparative Performance Between Drop–Out Detection and Viterbi Reliability Metric Erasure Flagging," *IEEE Transactions on Magnetics*, vol. 28, No. 5, Sep. 1992, pp. 2898–2900.

C. Menyennett, L. Botha, and H.C. Ferreira, "A NewRunlength Limited Code for Binary Asymmetric Channels," *IEEE Transactions on Magnetics*, vol. 28, No. 5, Sep. 1992, pp. 2901–2903.

Gang H. Lin, Rick Barndt, H. Neal Bertram, and Jack K. Wolf, "Experimental Studies of Nonlinearities in High Density Disk Recording," *IEEE Transactions on Magnetics*, vol. 28, No. 5, Sep. 1992, pp. 3279–3281.

Ralph Simmons and Robert Davidson, "Media Design for User Density of up to 3 Bits per Pulse Width," *IEEE Transactions on Magnetics*, vol. 29, No. 1, Jan. 1993, pp. 169–176.

Jaekyun Moon and Jian–Gang Zhu, "Nonlinearities in Thin–Film Media and Their Impact on Data Recovery," *IEEE Transactions on Magnetics*, vol. 29, No. 1, Jan. 1993, pp. 177–182.

R.D. Barndt, A.J. Armstrong , and J.K. Wolf, "Media Selection for High Density Recording Channels," *IEEE Transactions on Magnetics*, vol. 29, No. 1, Jan. 1993, pp. 183–188.

Dean C. Palmer and Jonathan D. Coker, "Media Design Consideration for a PRML Channel," *IEEE Transactions on Magnetics*, vol. 29, No. 1, Jan. 1993, pp. 189–194.

Zadian Software, Inc., *Disk Drive Technology*, Copyright 1990, San Jose, CA.

United States Patent Application for "System and Method for Reconstructing a Signal Wave in a Partial Response Read Channel," 32 pages of text and 8 figures, (Serial number and filing date is unknown.).

Roy D. Cideciyan, Francois Dolivo, Reto Hermann, Walter Hirt, and Wolfgang Schott, "A PRML System for Digital Magnetic Recording," *IEEE Journal on Selected Areas in Communications*, vol. 10, No. 1, Jan. 1992, pp. 38–56.

ERROR ESTIMATION CIRCUIT AND METHOD USING AN ANALOG-TO-DIGITAL CONVERTER

This application claims the benefit of U.S. Provisional No. 60/013,663 filed Mar. 19, 1996.

TECHNICAL FIELD OF THE INVENTION

This invention relates generally to the field of information storage and more particularly to an error estimation circuit and method using an analog-to-digital converter.

BACKGROUND OF THE INVENTION

As computer hardware and software technology continues to progress, the need for larger and faster mass storage devices for storing computer software and data continues to increase. Electronic databases and computer applications such as multimedia applications require large amounts of disk storage space. An axiom in the computer industry is that there is no such thing as enough memory and disk storage space.

To meet these ever increasing demands, hard disk drive developers continue to evolve and advance the technology. Some of the early disk drives had a maximum storage capacity of five megabytes and used fourteen inch platters, whereas today's hard disk drives are commonly over one gigabyte and use 3.5 inch platters. Correspondingly, advances in the amount of data stored per unit of area, or areal density, have dramatically accelerated. For example, in the 1980's, areal density increased about thirty percent per year while in the 1990's annual areal density increases have been around sixty percent. The cost per megabyte of a hard disk drive is inversely related to its areal density.

Mass storage device manufacturers strive to produce high speed hard disk drives with large data capacities at lower and lower costs. A high speed hard disk drive is one that can store and retrieve data at a fast rate. One aspect of increasing disk drive speed and capacity is to improve or increase the areal density. Areal density may be increased by improving the method of storing and retrieving data.

In general, mass storage devices, such as hard disk drives, include a magnetic storage media, such as rotating disks or platters, a spindle motor, read/write heads, an actuator, a pre-amplifier, a read channel, a write channel, a servo controller, and control circuitry to control the operation of the hard disk drive and to properly interface the hard disk drive to a host or system bus. The read channel, write channel, servo controller, and memory may all be implemented as one integrated circuit that is referred to as a data channel. The control circuitry often includes a microprocessor for executing control programs or instructions during the operation of the hard disk drive.

A hard disk drive (HDD) performs write and read operations when storing and retrieving data. A typical HDD performs a write operation by transferring data from a host interface to its control circuitry. The control circuitry then stores the data in a local dynamic random access memory (DRAM). A control circuitry processor schedules a series of events to allow the information to be transferred to the disk platters through a write channel. The control circuitry moves the read/write heads to the appropriate track and locates the appropriate sector of the track. A sector generally has a fixed data storage capacity, such as 512 bytes of user data per sector. Finally, the HDD control circuitry transfers the data from the DRAM to the located sector of the disk platter through the write channel. The write channel may encode the data so that the data can be more reliably retrieved.

In a read operation, the appropriate sector to be read is located and data that has been previously written to the disk is read. The read/write head senses the changes in the magnetic flux of the disk platter and generates a corresponding analog signal. The analog signal is known as an analog read signal or analog data signal. The read channel receives the analog data signal, conditions the signal, and detects "zeros" and "ones" from the signal. The read channel conditions the signal by amplifying the signal to an appropriate level using automatic gain control (AGC) techniques. The read channel then filters the signal, to eliminate unwanted high frequency noise, equalizes the channel, detects "zeros" and "ones" from the signal, and formats the binary data for the control circuitry. The binary or digital data is then transferred from the read channel to the control circuitry and is stored in the DRAM of the control circuitry. The processor then communicates to the host that data is ready to be transferred.

As the disk platters are moving, the read/write heads must align or stay on a particular track. This is accomplished by reading information from the disk called a servo wedge. Generally, each sector has a corresponding servo wedge. The servo wedge indicates the position of the heads. The data channel receives this position information so the servo controller can continue to properly position the heads on the track for read and write operations.

Traditional HDD read channels used a technique known as peak detection for extracting or detecting digital information from the analog information stored on the magnetic media. In this technique, the waveform is level detected and if the waveform level is above a threshold during a sampling window, the data is considered a "one." More recently, advanced techniques utilizing discrete time signal processing (DTSP) to reconstruct the original data written to the disk are being used in read channel electronics to improve areal density. In these techniques, the data is synchronously sampled using a data recovery clock. The sample is then processed through a series of mathematical manipulations using signal processing theory.

There are several types of synchronously sampled data (SSD) channels. Partial response, maximum likelihood (PRML); extended PRML (EPRML); enhanced, extended PRML (EEPRML); fixed delay tree search (FDTS); and decision feedback equalization (DFE) are several examples of different types of SSD channels using DTSP techniques. The maximum likelihood detection performed in several of these systems is usually performed by a Viterbi decoder implementing the Viterbi algorithm, named after Andrew Viterbi who developed it in 1967.

The SSD channel or read channel generally requires mixed-mode circuitry for performing a read operation. During a read operation, the circuitry receives an analog data signal from a preamplifier and amplifies the signal while performing automatic gain control (AGC) to amplify the signal to a known level. Continuous time filtering is performed to remove unwanted noise and to provide waveform shaping. The signal is sampled and equalized to provide an equalized, analog signal having discrete values in a sample data domain or discrete time domain. The equalized signal is then provided to a detector and a digital error estimation circuit. The detector analyzes the signal to provide a digital read signal, while the digital error estimation circuit estimates an error for use as a feedback signal in timing recovery and gain control. A deserializer circuit then converts the digital read signal from a serial format to a parallel format. In all SSD channels, the major goal during a read operation is to accurately retrieve the data with the lowest bit error rate (BER) in the highest noise environment. The SSD channel circuitry may be implemented on a single integrated circuit package that contains various input and output (I/O) pins.

Digital error estimation circuits convert the equalized, analog data signal from the analog domain to the digital domain before performing error calculations. The error corresponds to the difference between the actual discrete values of the equalized signal and a target value. The digital error estimation circuits use an analog-to-digital converter (ADC) to convert the equalized, analog signal from the analog domain to the digital domain. The ADC may be a relatively large ADC such as a six-bit flash ADC. A six-bit ADC uses at least sixty-four comparators to perform the conversion. The ADC circuitry creates several disadvantages and problems in an SSD channel. For example, to implement the ADC requires additional circuitry which increases the overall silicon and size of the SSD channel circuit. The additional circuitry also increases fabrication costs and power consumption. Power consumption is especially critical in portable or battery powered applications such as laptop or notebook computers.

The digital error estimation circuit having a large ADC also suffers the disadvantage of reducing overall HDD storage capacity. The additional circuitry needed to implement the large ADC generates circuit delays which reduce or limit the overall bandwidth of the SSD channel. This results in an HDD having a reduced areal density or storage capacity.

SUMMARY OF THE INVENTION

From the foregoing it may be appreciated that a need has arisen for an improved error estimation circuit and method using an analog-to-digital converter for providing a read channel error signal. In accordance with the present invention, an error estimation circuit and method using an analog-to-digital converter is provided which substantially eliminates and reduces the disadvantages and problems of previously developed error estimation circuits using large or full analog-to-digital converters to generate a digital error signal. The present invention performs analog error calculations and generates two error signals such that a digital error signal can be provided using a small or depopulated analog-to-digital converter as opposed to a full analog-to-digital converter. The elimination of the requirement of a large or full analog-to-digital converter reduces overall costs and power consumption while increasing overall HDD storage capacity.

According to the present invention, a read channel for use in a mass storage system is provided. The read channel includes a plurality of circuit modules and an error estimation circuit. The plurality of circuit modules receive and process stored data in the form of an analog data signal such that a corresponding digital data signal is generated in response to the processing. The error estimation circuit receives and analyzes a processed analog data signal from one of the plurality of circuit modules to generate a digital error signal and a digital level estimation signal in response.

The present invention provides various technical advantages over previously developed error estimation circuits using full analog-to-digital converters. A technical advantage of the present invention includes the ability to provide a digital error signal corresponding to the difference between a target value and the discrete value of a sampled or equalized analog signal while reducing overall circuitry, silicon area, fabrication costs, and power requirements. The reduction in circuitry provides still another technical advantage. Specifically, the elimination of circuitry decreases the number of circuit delays which results in increased read channel bandwidth and operational speed. The increased bandwidth and operational speed increases the overall HDD storage capacity. Other technical advantages are readily apparent to one skilled in the art from the following figures, description, and claims.

BRIEF DESCRIPTION OF THE DRAWINGS

For a more complete understanding of the present invention and the advantages thereof, reference is now made to the following brief description, taken in connection with the accompanying drawings and detailed description, wherein like reference numerals represent like parts, in which:

FIG. 4 is a waveform diagram illustrating the equalizer output waveform and the low pass filter output waveform of the read channel.

DETAILED DESCRIPTION OF THE INVENTION

Figure 1:
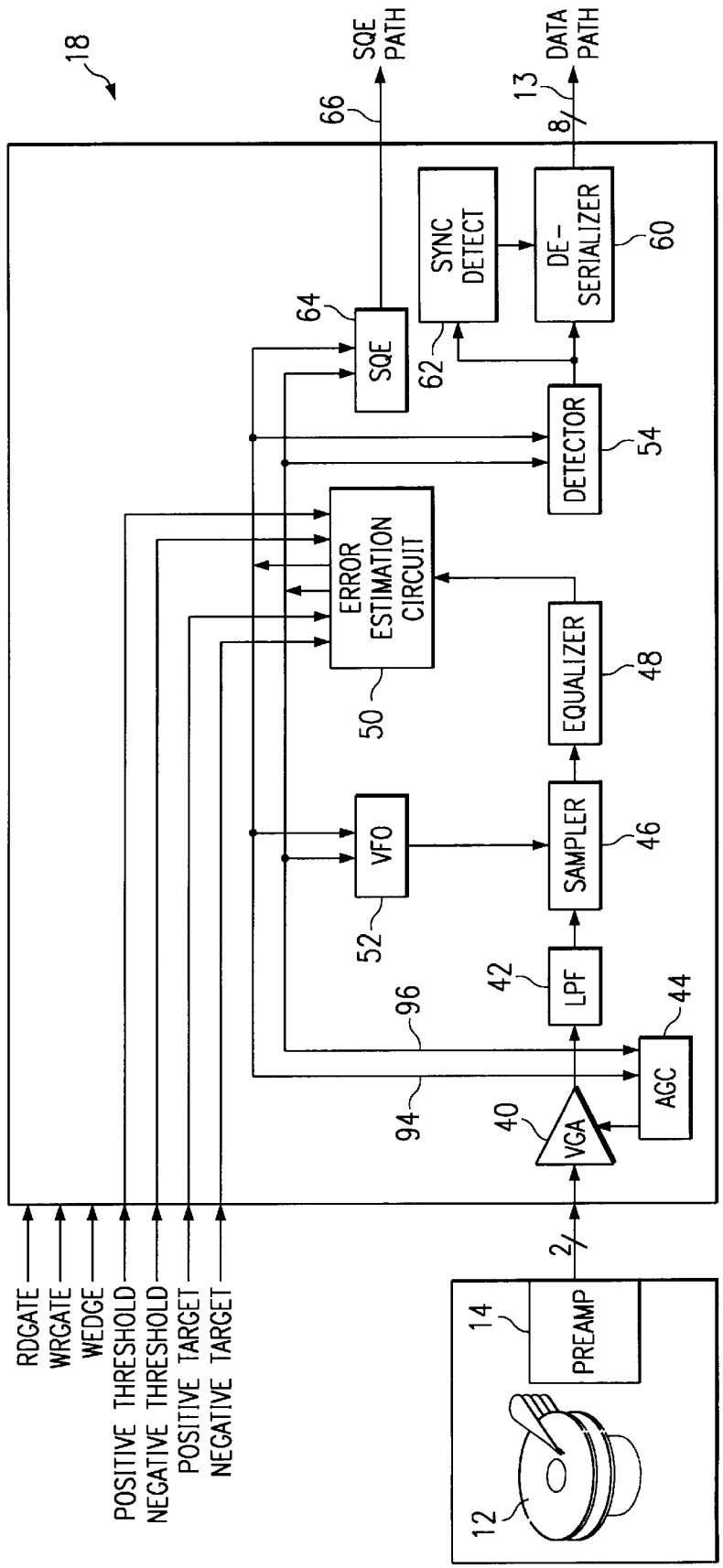
FIG. 1 is a block diagram illustrating a read channel of a mass storage system.

FIG. 1 is a block diagram of read channel 18 of a mass storage system. Read channel 18 includes a variety of circuit modules used to process and condition an analog data signal received from a preamplifier 14 and a disk/head assembly 12 during a read operation. The circuit modules of read channel 18 include a variable gain amplifier (VGA) 40, an automatic gain control circuit (AGC) 44, a low pass filter (LPF) 42, a sampler 46, an equalizer 48, a detector 54, a synchronization detect circuit (sync detect) 62, a deserializer 60, an error estimation circuit 50, a variable frequency oscillator (VFO) 52, and a squared error circuit (SQE) 64. All of these circuit modules of read channel 18 are used during a read operation to perform various functions to condition the analog data signal so that the signal is received at VGA 40 and a corresponding digital data signal is provided at a data path 13. The digital data is then supplied to control circuitry and ultimately to a host system. The combination or subcombination of all of these circuit modules may be referred to as a read channel processing circuit.

The signals RDGATE, WRGATE, and WEDGE are supplied to read channel 18 and may be accessed by the various circuit modules. A read operation is performed in read channel 18 when the RDGATE signal is enabled. The WRGATE is enabled when a write operation is to be performed in the hard disk drive and the WEDGE signal is enabled when a servo wedge operation is to be performed.

Figure 2:
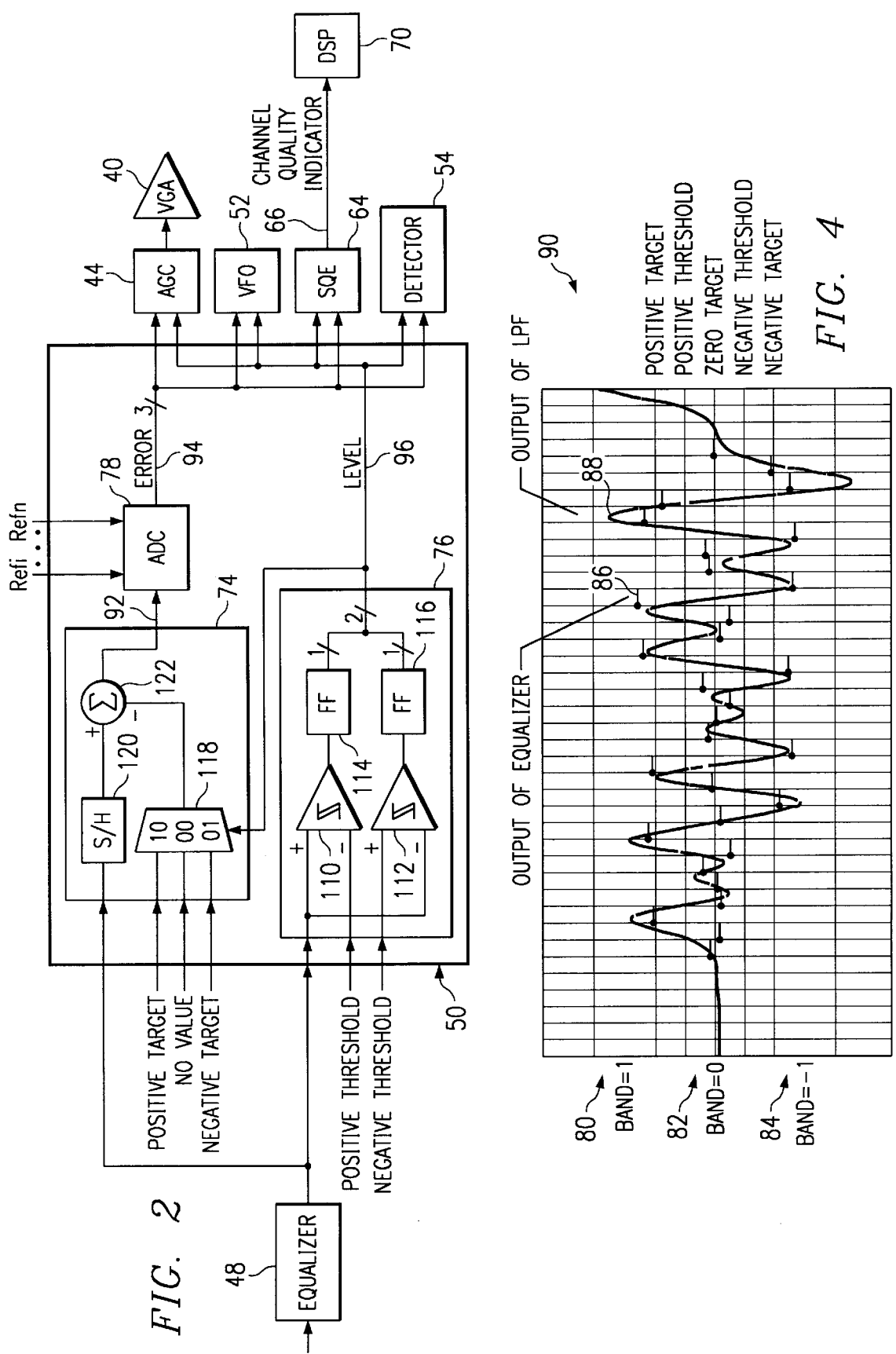
FIG. 2 is a block diagram illustrating an error estimation circuit of the read channel.

VGA 40 receives an analog data signal from preamplifier 14 that originates from disk/head assembly 12. VGA 40, along with AGC 44, work together to provide an appropriate amplification to the analog data waveform needed by read channel 18. AGC 44 receives digital feedback signals from error estimation circuit 50 so that appropriate adjustments can be made in the amplification or gain provided to the analog data signal by VGA 40. Error estimation circuit 50, as shown more fully in FIG. 2, provides a digital error signal 94 and a digital level estimation signal 96 to AGC 44 during sampled or discrete time signal processing. These signals may be multiplied and used to assist AGC 44 with establishing the gain of VGA 40.

The amplified analog data signal is provided by VGA 40 to LPF 42 for further processing in read channel 18. LPF 42 receives the amplified analog data signal and filters the signal to remove unwanted high frequency noise. LPF 42 also provides waveform shaping with amplitude boost. LPF 42 may be a continuous time 7th order filter designed using Gm/C components that may be operated in a data mode and a servo mode. The cutoff frequency and boost of LPF 42 may be programmable. The filtered output signal of LPF 42 is provided to sampler 46.

Sampler 46 receives the filtered output signal and synchronously samples the continuous time signal at discrete times. Sampler 46 holds and provides the sampled value until the next sample time to provide a discrete, analog signal. VFO 52 controls sampler 46 by providing a signal indicating when sampler 46 should sample and hold the signal. The output of sampler 46 is a discrete, analog signal having discrete values. Each discrete value corresponds to the value or amplitude of the filtered output signal at the time the signal was sampled by sampler 46. Sampler 46 may be a sample and hold circuit, such as a circular sample and hold circuit, that is time sequence multiplexed to equalizer 48 so that the correct time sequenced value is presented to equalizer 48.

Equalizer 48 receives the discrete, analog signal from sampler 46 and provides a discrete, equalized signal that is equalized to the target function of detector 54. Equalizer 48 may be a finite impulse response filter or FIR that employs a plurality of filter coefficients or taps to filter the signal. Equalizer 48 includes a plurality of multipliers that each receive one of the filter coefficients and a consecutive value from the discrete, analog signal of sampler 46. The outputs of each of the multipliers are then provided to an adder, such as an analog summer, which sums the inputs and serves as the output of equalizer 48. As the discrete, analog signal changes, the consecutive discrete, analog values provided by sampler 46 to each multiplier of equalizer 48 are shifted to the next multiplier such that a new discrete value from sampler 46 is provided to the first multiplier and the oldest discrete value from sampler 46 is dropped from the last multiplier.

Equalizer 48 may be a five tap filter with coefficients set by programmable digital circuitry. For example, equalizer 48 may receive five digital coefficients or filter tap weights that are converted to an analog value through a digital-to-analog converter. Each coefficient is then provided to a separate multiplier. The outputs of all five of the multipliers are provided to an analog summer to provide the discrete, equalized signal. The number of coefficients or taps and corresponding multipliers may vary. Equalizer 48 provides the discrete, equalized signal to error estimation circuit 50, which is discussed below.

Detector 54 is a digital detector that receives and analyzes a digital error signal 94 and a digital level estimation signal 96 from error estimation circuit 50 to produce a digital data output signal corresponding to the data stored on disk/head assembly 12. Detector 54 multiplies digital error signal 94 and digital level estimation signal 96 to generate an input signal. Digital level estimation signal 96 may be shifted by a value before being multiplied. The resulting input signal corresponds to the discrete, equalized signal provided by equalizer 48. In one embodiment, detector 54 may be a maximum likelihood detector or Viterbi decoder implementing the Viterbi algorithm. Assuming that detector 54 is implemented as a Viterbi decoder, detector 54 includes an add, compare, and select circuit (ACS), a metric, and a trellis for decoding the input signal. The ACS may include programmable operational parameters stored in a storage register. The output of the ACS is provided to the trellis which acts as a logic tree for sequence decoding of the input signal. The trellis provides a digital data output signal which serves as the digital data output signal of detector 54.

Sync detect 62 receives the digital data output signal and provides a synchronization detect signal. Sync detect 62 searches for the presence of a synchronization byte or field in the digital data output signal and enables the synchronization detect signal when a synchronization byte is detected. Sync detect 62 may search for the synchronization byte over a predefined period or "window" of time that the synchronization byte should be present. Sync detect 62 may include a register for storing a predefined synchronization byte and digital logic circuitry to compare the digital data output signal to the predefined synchronization byte.

Deserializer 60 receives the digital data output signal and the synchronization detect signal. The digital data output signal is provided to data/parameter path 13 in parallel format when the synchronization detect signal is enabled. Deserializer 60 places the digital data in an appropriate parallel format such as an eight or nine-bit format.

Error estimation circuit 50 receives the discrete, equalized signal provided by equalizer 48 and provides a digital error signal 94 and digital level estimation signal 96. Digital level estimation signal 96 is a two bit signal that corresponds to the band or level where the discrete value of the discrete, equalized signal of equalizer 48 is located. Digital level estimation signal 96 and digital error signal 94 are provided to VFO 52, AGC 44, SQE 64, and detector 54. A positive and negative target value and a positive and negative threshold value are also provided to error estimation circuit 50 for use in calculating digital error signal 94. Error estimation circuit 50 is illustrated more fully in FIG. 2 and discussed below.

VFO 52 controls the sample time or sample intervals of sampler 46. During a read operation, VFO 52 receives digital error signal 94 and digital level estimation signal 96 from error estimation circuit 50 and adjusts the frequency of its output signal so that sampler 46 properly samples the filtered output signal provided by LPF 42. VFO 52, sampler 46, equalizer 48, and error estimation circuit 50 together provide a sampled time phase locked loop function to read channel 18.

SQE 64 receives digital error signal 94 and digital level estimation signal 96 provided by error estimation circuit 50. SQE 64 provides a squared error signal corresponding to the square of digital error signal 94 provided by error estimation circuit 50. This signal serves as a channel quality indicator by demonstrating the equalization being performed by equalizer 48. The squared error signal is provided to external processing circuitry through SQE path 66. The squared error signal may then be analyzed by a digital signal processor. The results of the analysis of the squared error signal may then be used to fine tune or manipulate the various programmable operational parameters of read channel 18 to further enhance performance. The programmable coefficients or operational parameters provided to equalizer 48 may be modified to increase overall read channel performance. For example, during burn-in, known data may be written to disk/head assembly 12 and then read by read channel 18. The squared error signal may then be analyzed to fine tune the operational parameters used in the various circuit modules of read channel 18.

In operation, read channel 18 receives an analog data signal from disk/head assembly 12 through preamplifier 14 when the RDGATE signal is enabled. VGA 40 receives the analog data signal and provides appropriate gain or boost to the analog data signal which is then filtered by LPF 42. AGC 44 provides a gain signal to VGA 40 to establish the appropriate amplification or gain needed by read channel 18. Error estimation circuit 50 provides digital error signal 94 and digital level estimation signal 96 to AGC 44 for use in establishing the gain signal.

Sampler 46, under the control of VFO 52, receives the filtered output signal from LPF 42 and samples the signal. Sampler 46 then provides a discrete, analog signal to equalizer 48. Equalizer 48 further conditions and equalizes the signal and provides a discrete, equalized signal to error estimation circuit 50. Error estimation circuit 50 analyzes the discrete, equalized signal to provide two signals, digital error signal 94 and digital level estimation signal 96. Digital level estimation signal 96 estimates which of three levels or bands the discrete, equalized is located. Digital error signal 94 determines the difference or error that the discrete, equalized signal is from a targeted value. Detector 54 receives both digital level estimation signal 96 and digital error signal 94 and analyzes the signals to provide a digital data output signal. The digital data output signal corresponds to the stored data. The digital data output signal is provided to deserializer 60 which then places the signal into parallel format. Deserializer 60 provides the digital data output signal to data path 13 after sync detect 62 detects a synchronization byte and sends the synchronization detect signal to deserializer 60.

FIG. 2 is a block diagram of error estimation circuit 50 of read channel 18. Error estimation circuit 50 includes a level estimator 76, an error calculator 74, and an analog-to-digital converter (ADC) 78 to provide digital error signal 94 and digital level estimation signal 96.

Level estimator 76 receives the discrete, equalized signal from equalizer 48, a positive threshold value, and a negative threshold value. The positive threshold value and the negative threshold value are programmable values that indicate the relative divisions between a positive band, a zero band and a negative band. Level estimator 76 provides digital level estimation signal 96 which indicates whether the value of the discrete, equalized signal provided by equalizer 48 is located in the positive band, the negative band, or the zero band.

Level estimator 76 compares the discrete value of the discrete, equalized signal to the positive threshold value and the negative threshold value to determine if the discrete value falls above the positive threshold, below the negative threshold, or between the positive threshold and the negative threshold. This may be accomplished in circuitry by using a first comparator 110 to compare the positive threshold to the discrete, equalized signal and a second comparator 112 to compare the negative threshold to the discrete, equalized signal. The results of each of these comparators are provided to a register such as a flip-flop.

First comparator 110 provides a digital "one" to flip-flop 114 if the discrete, equalized signal is greater than the positive threshold value and provides a digital "zero" to flip-flop 114 if the discrete, equalized signal is less than the positive threshold value. Similarly, second comparator 112 provides a digital "one" to flip-flop 116 if the negative threshold value is greater than the discrete, equalized signal and provides a digital "zero" to flip-flop 116 if the negative threshold value is less than the discrete, equalized signal. The output of flip-flop 114 and flip-flop 116 are together provided as a two-bit signal that serves as digital level estimation signal 96. The timing of flip-flops 114 and 116 are controlled by a clock signal not shown in FIG. 2.

Although specific circuitry has been shown to perform level or band estimation, level estimation may be performed in a variety of ways employing different circuitry. Level estimator 76 provides digital level estimation signal 96 corresponding to one of the three bands in which the discrete value of the discrete, equalized signal is located. The three bands may also be referred to as levels such as a positive one level, a negative one level, and a zero level. FIG. 4, discussed more fully below, illustrates the three bands or levels. If the output of flip-flop 114 is assumed to be the most significant bit of digital level estimation signal 96, then a value of "10" indicates the positive band, a value of "00" indicates the zero band, and a value of "01" indicates a negative band. A value of "11" is an invalid state.

Error calculator 74 receives the discrete, equalized signal, a positive target value, a negative target value, a zero target value, and digital level estimation signal 96. The positive, negative, and zero target values are programmable values that represent the desired or ideal values of each level or band. Error calculator 74 generates analog error output signal 92 corresponding to the difference between the discrete value of the discrete, equalized signal of equalizer 48 and the target value of the estimated band provided by digital level estimation signal 96. For example, if level estimator 76, through digital level estimation signal 96, estimates that a discrete value of the discrete, equalized signal is located in the positive band, then error calculator 74 responds by generating analog error output signal 92 that is the difference between the discrete, equalized value and the positive target value. If the discrete value of the discrete, equalized signal is estimated to be located in the negative band, error calculator 74 generates analog error output signal 92 so that it is equal to the difference between the discrete, equalized value and the negative target value. Similarly, if level estimator 76 estimates that the discrete value of the discrete, equalized signal is located in the zero band, then analog error output signal 92 is generated at a value that is equal to the difference between the discrete, equalized value and the zero target value.

The circuitry of error calculator 74 may include any of a variety of circuit elements such as multiplexer 118, sample/hold circuit 120, and analog summer 122. Multiplexer 118 provides either the positive target value, the negative target value, or the zero target value to analog summer 122 depending on the value of digital level estimation signal 96. A value of "10" provides the positive target value, a value of "00" provides the zero target value, and a value of "01" provides a negative target value. Sample/hold circuit 120 receives the discrete, equalized signal and holds its value. Sample/hold circuit 120 provides this value to analog summer 122. Analog summer 122 subtracts the value provided by multiplexer 118 from the output of sample/hold circuit 120 to generate analog error output signal 92.

ADC 78 receives analog error output signal 92 and a plurality of reference voltages and converts analog error output signal 92 into digital error signal 94. ADC 78 may be a parallel or "flash" analog-to-digital converter that includes a plurality of comparators whose outputs are provided to an encoder. Each comparator compares the discrete value provided by analog error output signal 92 to the reference voltage. The results of each of these comparisons are provided to an encoder, as shown more fully in FIG. 3. The encoder encodes the outputs of the comparators into a number of digital signals such as a three-bit or four-bit digital signal. Although, ADC 78 is described and shown as a "flash" analog-to-digital converter, any of a variety of other types of analog-to-digital convertors may be used.

Error estimation circuit 50 provides two groups of output signals, digital error signal 94, generated by error calculator 74 and ADC 78, and digital level estimation signal 96, generated by level estimator 76. These signals are provided as inputs to AGC 44, VFO 52, and SQE 64. As discussed above, detector 54 also receives these signals. AGC 44 receives the output signals from error estimation circuit 50 and uses them to determine the appropriate gain to be supplied to VGA 40. AGC 44 may multiply the error signals together using a digital multiplier to rectify digital error signal 94 and eliminate the error values in the zero band. This signal may then be converted to a current and used to control VGA 40. A damping or gain factor may also be provided to AGC 44 to provide stability to the gain circuitry and to assist in loop dynamics. Stability may become more important if level estimator 76 is unable to provide an accurate band estimate which then results in an incorrect error signal.

VFO 52 receives digital error signal 94 and digital level estimation signal 96 and uses them to adjust the frequency of the read clock during read operations. This may be accomplished by multiplying the two output signals together and determining the slope between two consecutive multiplications. This output is then provided to an RC filter and summed with the normal frequency control signal.

SQE 64 also receives digital error signal 94 and digital level estimation signal 96 from error estimation circuit 50 and provides a squared error signal. This analog signal may be supplied external to read channel 18 through SQE path 66. The squared error signal may then be analyzed by a digital signal processor (DSP) 70.

In operation, level estimator 76 and error calculator 74 receive the discrete, equalized signal from equalizer 48 during a read operation. Level estimator 76 compares the discrete value of the discrete, equalized signal to the positive threshold value and the negative threshold value. As a result of these comparisons, digital level estimation signal 96 is generated having two bits. Digital level estimation signal 96 indicates the band or level where the discrete value is located. Digital level estimation signal 96 is provided to error calculator 74 and is also provided as an output of error estimation circuit 50.

Error calculator 74 receives digital level estimation signal 96 and calculates analog error output signal 92. Analog error output signal 92 corresponds to the difference between the discrete values of the discrete, equalized signal provided equalizer 48 and the target value of the band in which the discrete value is located. The differences between the discrete values located in the positive band and the positive target value, the differences between the discrete values located in the zero band and the zero target value, and the differences between the discrete values located in the negative band and the negative target value determine the values of analog error output signal 92. Digital level estimation signal 96 provides the appropriate band for the discrete values of the discrete, equalized signal so that the appropriate error calculation just described can be performed. Analog error output signal 92 results from these circuit calculations.

ADC 78 receives analog error output signal 92 and provides digital error signal 94. Analog error output signal 92 is converted from the analog domain to the digital domain using a "flash" analog-to-digital conversion technique. Digital error signal 94, along with digital level estimation signal 96, is provided to AGC 44, VFO 52, SQE 64, and detector 54.

Figure 3:
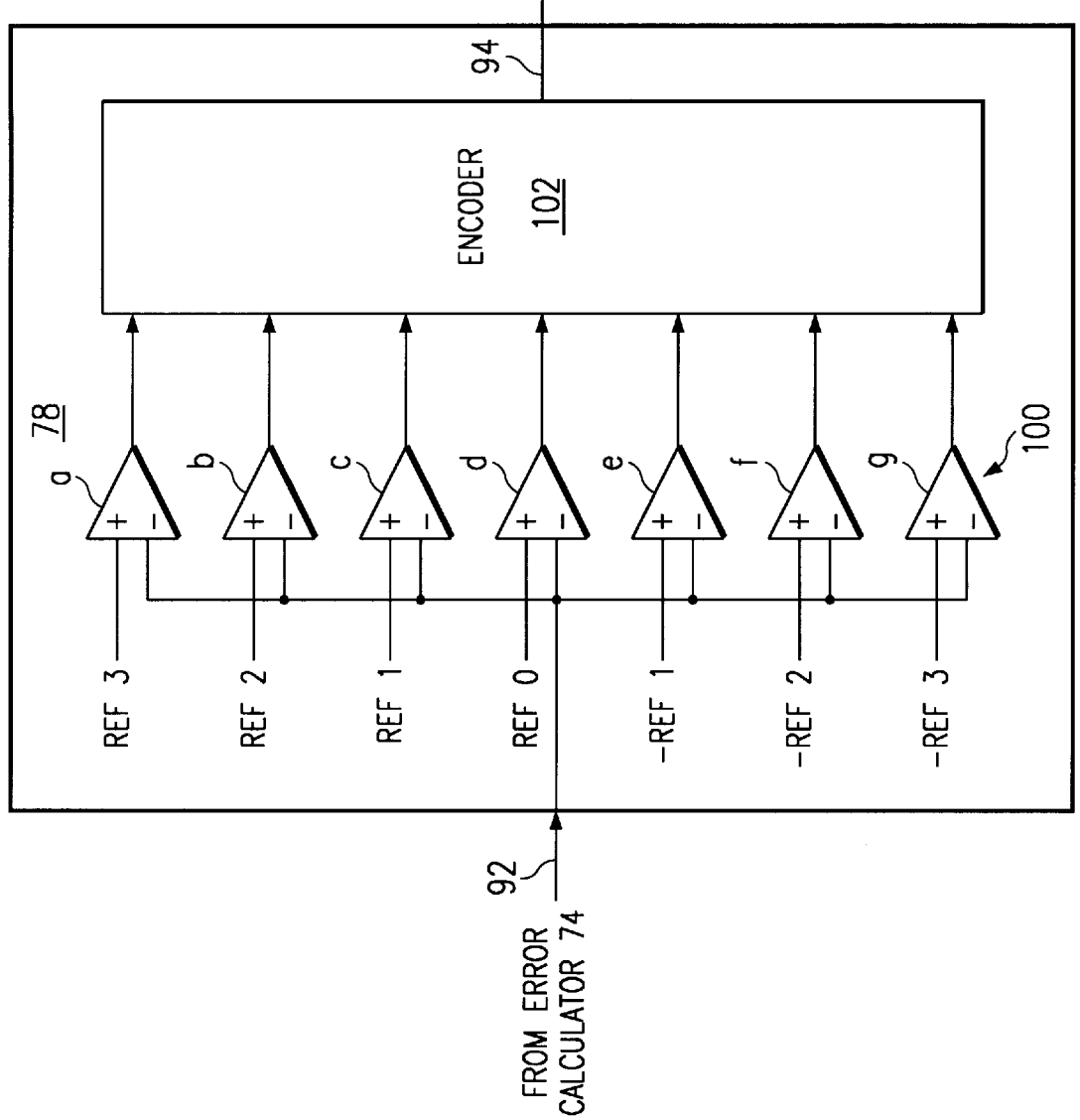
FIG. 3 is a circuit diagram illustrating an analog-to-digital converter of the error estimation circuit.

FIG. 3 is a circuit diagram of ADC 78 of error estimation circuit 50. ADC 78 is shown as a "flash" analog-to-digital converter which receives analog error output signal 92 from error calculator 74 and converts the signal to digital error signal 94. ADC 78 includes seven input comparators, illustrated as input comparators 100a through 100g, and an encoder 102. Encoder 102 receives the outputs of input comparators 100a through 100g and provides digital error signal 94 as a result of receiving these inputs. Digital error signal 94 is provided by encoder 102 as a three-bit signal but may be provided in various sizes. Although ADC 78 has been described and shown as a full "flash" ADC, any of a variety of other analog-to-digital converters may be used such as a one-bit analog-to-digital comparator, a depopulated ADC, or an exponential ADC.

Input comparators 100a, 100b, 100c, 100d, 100e, 100f, and 100g each receive analog error output signal 92 from error calculator 74 and a predefined reference voltage. Each input comparator receives a different predefined reference voltage. The input comparators compare the discrete value of analog error output signal 92 to the predefined reference voltage and provide a digital output signal to encoder 102. The digital output signal of each input comparator indicates whether the predefined reference voltage is greater than or less than the discrete value of analog error output signal 92. For example, if the predefined reference voltage is smaller than the discrete value, a "one" is provided at the output of the comparator. The input comparators may be implemented using any of a number of available circuits such as a high gain differential amplifier.

The predefined reference voltages are provided over a range of voltages extending from a positive voltage to a negative voltage and at various uniform increments in between. The predefined reference voltage provided to input comparator 100a is a positive voltage such as positive three volts as indicated by REF 3 in FIG. 3. The predefined reference voltages are provided at lower and lower voltages as you move from input comparator 100a to input comparator 100g. The predefined reference voltage provided to input comparator 100g is a negative voltage approximately equal to the magnitude of the predefined reference voltage provided to input comparator 100a. For example, the predefined reference voltages provided to input comparators 100a through 100g may be the following: positive three volts as indicated by REF 3; positive two volts as indicated by REF 2; positive one volt as indicated by REF 1, zero volts as indicated by REF 0; negative one volt as indicated by –REF 1; negative two volts as indicated by –REF 2; and negative three volts as indicated by –REF 3. The value of these reference voltages may be programmable.

Encoder 102 receives the outputs of input comparators 100a through 100g and provides a corresponding three-bit digital output signal that serves as digital error signal 94. Encoder 102 may be a priority encoder that generates a binary code corresponding to the reference voltage supplied to the comparator generating a digital "one" and receiving the highest reference voltage. Encoder 102 may contain various digital circuitry including circuitry to account for various error or invalid states presented by the input comparators. For example, encoder 102 may recognize an invalid state when receiving the following outputs from input comparators 100a through 100g respectively: 0, 0, 1, 0, 1, 1, and 1. In such a situation, encoder 102 may provide an output corresponding to the reference voltage provided to input comparator 100c or 100e. Encoder 102 may provide digital error signal 94 as a "signed" value using any of a variety of formats such as a sign magnitude representation, an offset binary representation, a 2's complement representation, or any other signed representation format.

In operation, encoder 102 receives the outputs of input comparators 100a through 100g and generates digital error signal 94. Each input comparator provides a signal to encoder 102 indicating whether its predefined reference voltage is smaller or larger than the discrete value. The value of digital error signal 94 corresponds to the predefined reference voltage provided to the input comparator receiving the highest predefined reference voltage and indicating that its predefined reference voltage is less than the discrete value of analog error output signal 92. For example, assume that the discrete value of analog error output signal 92 is equal to 1.2 volts and the predefined reference voltages are the same as the reference numbers indicated in FIG. 3. Input comparators 100a, with a reference voltage of three volts, and 100b, with a reference voltage of two volts, would produce a "zero" output while the remaining comparators would produce a "one" output signifying that their predefined reference values are less than 1.2 volts. Encoder 102 would then provide digital error signal 94 at its three-bit output corresponding to the fact that the discrete value of analog error output signal 92 is one volt. One volt is the highest reference voltage supplied to all of the input comparators indicating that their reference voltage is less than the discrete value. Similarly, if the discrete value is equal to negative 2.8 volts, only comparator 100g would provide a "one" output indicating that its predefined reference value of negative three volts is less than the discrete value of negative 2.8 volts. Encoder 102 would then provide a signed digital value corresponding to a negative three volts. Digital error signal 94 may be provided at both positive and negative values.

ADC 78 may be also be a depopulated ADC. The term "depopulated" refers to the use of a "flash" analog-to-digital converter where one or more of the input comparators have been eliminated from a full flash analog-to-digital converter. The fact that fewer input comparators are necessary reduces overall circuitry and circuit delays. A depopulated flash ADC may be used if resolution is not necessary at certain values. In such a case, the comparators of a flash ADC can be arranged such that resolution or accuracy is provided around these required values while comparators providing resolution or accuracy outside of these values can be eliminated.

ADC 78 may be also be an exponential ADC. An exponential ADC is a special case of the depopulated ADC. An exponential ADC provides high resolution close to a center value, such as that indicated by input comparator 100d, and less at the outer values. In this case, input comparators 100b and 100f may be eliminated if resolution is not needed around these input reference voltages. This provides a reduction in circuitry. ADC 78 may also be a one-bit analog-to-digital comparator that is provided a reference voltage centered around a one desired target value.

FIG. 4 is a waveform diagram 90 illustrating an analog low pass filter (LPF) output waveform 88 and a discrete, equalized signal 86 that are generated during a read operation. Discrete, equalized signal 86 may be the output of equalizer 48, and analog LPF output waveform 88 may be the output of LPF 42 during a read operation. Waveform diagram 90 includes a positive band 80, a zero band 82, and a negative band 84. A positive threshold value and a negative threshold value, like those provided to level estimator 76, are shown along with a positive target value and a negative target value, like those provided to error calculator 74. Positive band 80 encompasses the values above the positive threshold value; zero band 82 encompasses the values between the positive threshold value and the negative threshold value, and negative band 84 encompasses the values below the negative threshold value.

LPF output waveform 88 is an analog read signal that has been amplified and conditioned by a low pass filter to remove any high frequency noise. LPF output waveform 88 is shown initially in zero band 82 and then extending to positive band 80 and eventually to negative band 84. Discrete, equalized signal 86 is a discrete, equalized signal that is equalized to the target function of a detector, such as detector 54 of read channel 18 shown in FIG. 1. Discrete, equalized signal 86 is initially located at zero band 82, then at positive band 80, and later at negative band 84. Discrete, equalized signal 86 results from the sampling and conditioning of LPF output waveform 88 to provide an equalized signal at discrete values.

An example of the operations performed by error estimation circuit 50 of FIG. 2 can be illustrated by referring to the discrete value of discrete, equalized signal 86 indicated at the reference numeral 86 of FIG. 4. Level estimator 76 compares the discrete value to the positive threshold value. This comparison results in the determination or estimate that the discrete value is in the positive band since the discrete value is greater than the positive threshold value. Level estimator 76 provides digital level estimation signal 96 indicating that the discrete value is located in the positive band. Error calculator 74 receives digital level estimation signal 96 and subtracts the positive target value from the discrete value to generate analog error output signal 92. ADC 78 converts analog error output signal 92 to digital error signal 94. Thus demonstrating the method in which error estimation circuit 50 calculates and provides digital error signal 94 and digital level estimation signal 96.

Thus, it is apparent that there has been provided, in accordance with the present invention, an error estimation circuit and method using an analog-to-digital converter that satisfies the advantages set forth above. For example, the present invention provides the technical advantage of providing a digital error signal without having to convert the discrete, equalized analog signal directly into the digital domain. This allows the use of an ADC requiring far fewer comparators and overall circuitry than a full analog-to-digital converter. The elimination of additional circuitry prevents the introduction of added circuit delays. The absence of these added circuit delays increases the read channel bandwidth and operational speed resulting in improved HDD storage capacity and speed. Although the preferred embodiment has been described in detail, it should be understood that various changes, substitutions, and alterations can be made herein. Also, the direct connections illustrated herein could be altered by one skilled in the art such that two devices are merely coupled to one another through an intermediate device or devices without being directly connected while still achieving the desired results demonstrated by the present invention. Other examples of changes, substitutions, and alterations are readily ascertainable by one skilled in the art and could be made without departing from the spirit and scope of the present invention. While the invention has been particularly shown and described by the foregoing detailed description, it will be understood by those skilled in the art that various other changes in form and detail may be made without departing from the spirit and scope of the invention as defined by the following claims.

What is claimed is:

1. A read channel for use in a mass storage system comprising:

a plurality of circuit modules including an equalizer operable to receive and process an analog data signal, the plurality of circuit modules operable to generate a digital data signal in response therefrom; and an error estimation circuit operable to receive and process an equalized signal corresponding to a processed analog data signal from said equalizer, the error estimation circuit operable to provide a digital error signal based on a difference between said equalized signal and a target signal, said target signal provided digital level voltage estimation signal, wherein the digital error signal and the digital level voltage estimation signal are input to said plurality of circuit modules.

2. The read channel of claim 1 wherein the error estimation circuit analyzes the processed analog data signal in the analog domain and produces an analog error signal, the error estimation circuit operable to generate the digital error signal using an analog-to-digital converter.

3. The read channel of claim 2 wherein the error estimation circuit includes a level estimator operable to generate the digital level voltage estimation signal, an error calculator operable to generate an analog error signal, and an analog-to-digital converter operable to receive the analog error signal and to generate the digital error signal.

4. The read channel of claim 3 wherein the level estimator is operable to receive a positive threshold value, a negative threshold value, and a filtered/equalized data signal from one of the plurality of circuit modules, and wherein the error calculator is operable to receive a positive target value, a negative target value, the digital level voltage estimation signal, and the filtered/equalized data signal.

5. The read channel of claim 4 wherein the level estimator is operable to provide the digital level voltage estimation signal corresponding to a positive band, a negative band, and a zero band by comparing a discrete value of the filtered/equalized data signal to the positive threshold value and the negative threshold value, and wherein the error calculator is operable to provide the analog error signal corresponding to the difference between the discrete value of the filtered/equalized data signal and a corresponding target value of the band that is determined by the digital level estimation signal.

6. The read channel of claim 5 wherein the level estimator includes a first comparator circuit operable to compare the discrete value of the filtered/equalized data signal to the positive threshold value and to produce a first digital comparison signal, a second comparator circuit operable to compare the discrete value of the filtered/equalized data signal to the negative threshold value and to produce a second digital comparison signal, and a digital logic circuit operable to receive the first digital comparison signal and the second digital comparison signal and to generate a digital level voltage estimation signal in response.

7. The read channel of claim 5 wherein the error calculator includes a sample and hold circuit operable to sample and hold the discrete value of the filtered/equalized data signal and to provide a discrete data value, a multiplexer operable to receive the digital level voltage estimation signal and to provide the corresponding target value in response, and an adder circuit operable to subtract the target value provided by the multiplexer from the discrete data value provided by the sample and hold circuit.

8. The read channel of claim 2 wherein the analog-to-digital converter is a depopulated analog-to-digital converter.

9. The read channel of claim 2 wherein the analog-to-digital converter is an exponential analog-to-digital converter.

10. The read channel of claim 2 wherein the analog-to-digital converter is a one-bit analog-to-digital comparator.

11. The read channel of claim 1 further comprising:

a digital multiplier operable to receive the digital error signal and the digital level estimation signal from the error estimation circuit, the digital multiplier operable to multiply the digital error signal and the digital level estimation signal to produce a digital band error signal therefrom.

12. A read channel for use in a mass storage system comprising:

an automatic gain control circuit having a variable gain amplifier, the automatic gain control circuit operable to receive a digital error signal and a digital level voltage estimation signal, the automatic gain control circuit operable to generate a gain signal from the digital error signal and the digital level voltage estimation signal, the variable gain amplifier operable to receive an analog data signal and to amplify the analog data signal according to the gain signal to generate an amplified analog data signal;

a filter circuit operable to receive, filter, and equalize the amplified analog data signal, the filter circuit operable to generate a filtered/equalized data signal having discrete values in response;

an error estimation circuit operable to receive and process the filtered/equalized data signal from the filter circuit, the error estimation circuit operable to provide a digital error signal based on a difference between the filtered/equalized data signal and a target signal, said target signal provided digital level voltage estimation signal and a detector operable to receive the digital error signal and the digital level voltage estimation signal and to provide a corresponding digital data signal to the automatic gain control circuitry.

13. The read channel of claim 12 wherein the error estimation circuit analyzes the filtered/equalized data signal in the analog domain and produces an analog error signal therefrom, the error estimation circuit operable to convert the analog error signal from the analog domain to the digital domain using an analog-to-digital converter to provide the digital error signal.

14. The read channel of claim 13 wherein the analog-to-digital converter is a depopulated analog-to-digital converter.

15. The read channel of claim 13 wherein the analog-to-digital converter is a one-bit analog-to-digital converter.

16. The read channel of claim 13 wherein the analog-to-digital converter is a flash analog-to-digital converter.

* * * * *